E. S. WOODS & J. C. W. GRETH.
WATER PURIFYING APPARATUS.
APPLICATION FILED FEB. 4, 1908.

984,635.

Patented Feb. 21, 1911.

2 SHEETS—SHEET 1.

E. S. WOODS & J. C. W. GRETH.
WATER PURIFYING APPARATUS.
APPLICATION FILED FEB. 4, 1908.

984,635.

Patented Feb. 21, 1911.
2 SHEETS—SHEET 2.

WITNESSES:
J. Herbert Bradley.
Fred Stout

INVENTORS,
Edwin S. Woods
John C. W. Greth
By F. W. H. Clay, Atty.

UNITED STATES PATENT OFFICE.

EDWIN S. WOODS, OF CHICAGO, ILLINOIS, AND JOHN C. W. GRETH, OF PITTSBURG, PENNSYLVANIA, ASSIGNORS TO WM. B. SCAIFE & SONS COMPANY, OF PITTSBURG, PENNSYLVANIA, A CORPORATION OF NEW JERSEY.

WATER-PURIFYING APPARATUS.

984,635.  Specification of Letters Patent.  Patented Feb. 21, 1911.

Application filed February 4, 1908. Serial No. 414,266.

*To all whom it may concern:*

Be it known that we, EDWIN S. WOODS and JOHN C. W. GRETH, citizens of the United States, residing, respectively, at Chicago, Illinois, and at Pittsburg, Pennsylvania, have jointly invented certain new and useful Improvements in Water-Purifying Apparatus, of which the following is a specification.

Our invention relates particularly to means for economically operating water purifying plants, having special reference to manipulating the devices for introducing chemicals and operating stirring devices for treating the water. Its primary object is to employ the power to be obtained from the supply or the head of water in the tanks, to run the feeding and stirring devices, thus doing away with outside sources of power.

Other objects and advantages of the invention will hereinafter appear.

Figure 1:
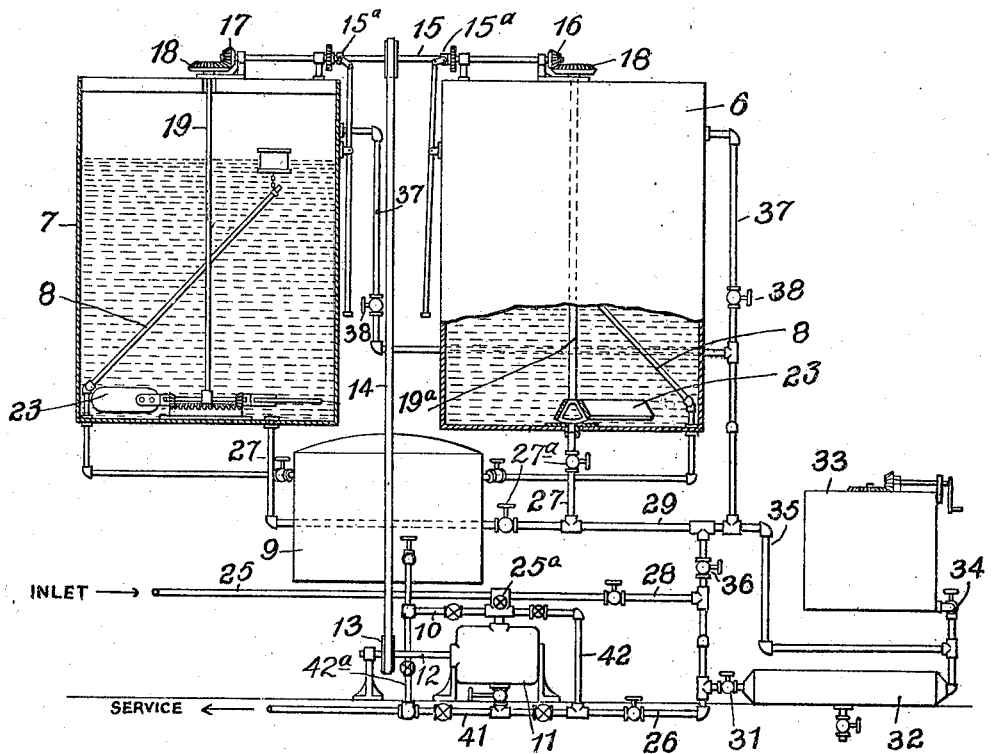
Figure 2:
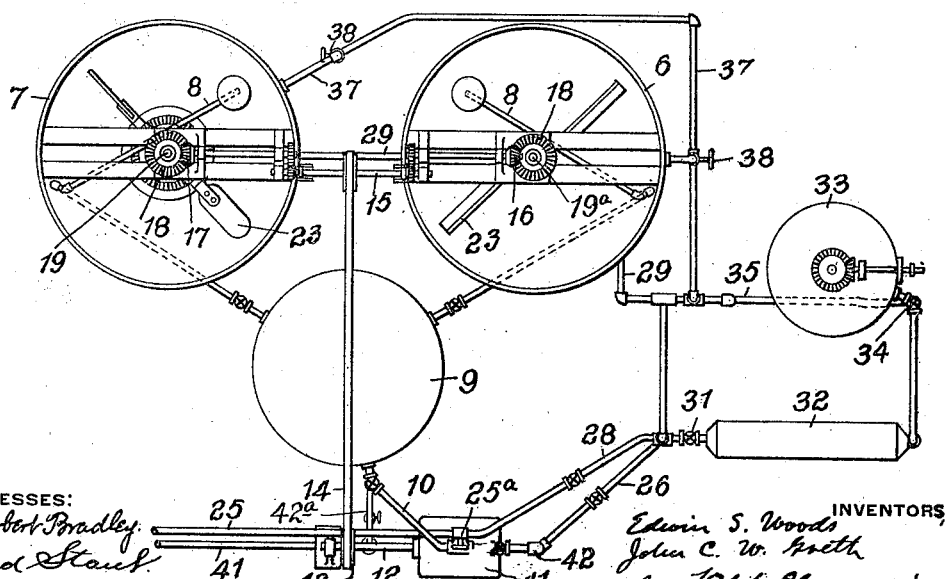
Figure 3:
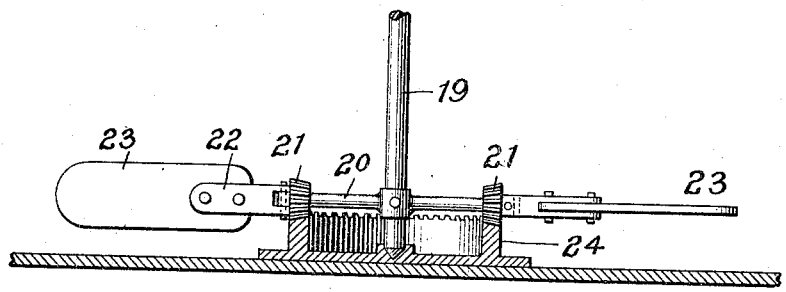
Figure 4:
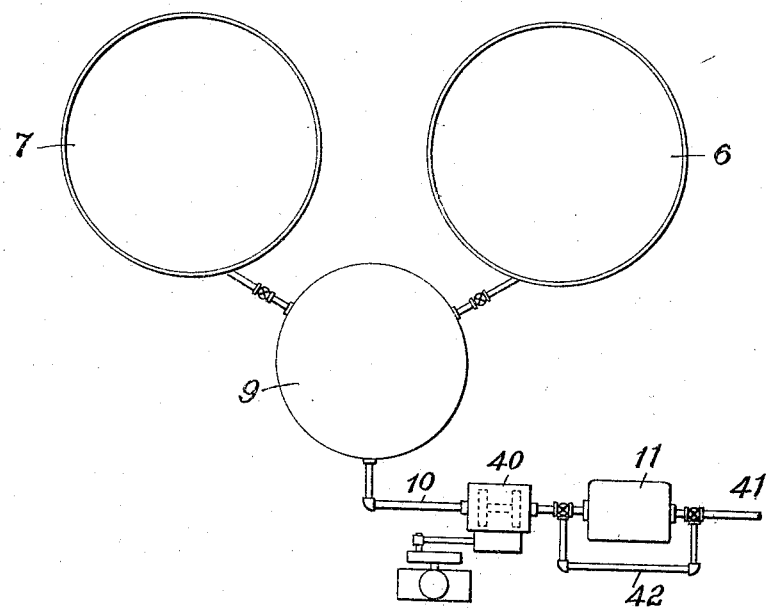

In the accompanying drawings, illustrating the invention as applied to intermittent systems, Figure 1 is a diagram in elevation and partial section showing the essentials of a plant using our invention, and Fig. 2 is a plan of the same. Fig. 3 is a detail showing an alternative form of stirring device and means for operating the same. Fig. 4 is a plan view illustrating a modification, in which a pump is used for drawing off the treated water.

Frequently in water purifying systems, there is quite a considerable pressure at the service pipe, due to the head of water in the treatment or storage tanks or filter; and this power has generally been of no use, since the regulation of the outflow by valves merely wastes the pressure. Similarly the pressure of the feed pipe has been unused, and in most cases extra pumps have been used for service, where there is any elevation of the water necessary. There are generally stirring devices employed in such plants for mixing in the chemicals and aiding in the reaction and these stirring devices have heretofore been operated by special motors or outside power. Even if the power of incoming water be used, in intermittent systems the inflow ceases before the stirring devices are through their work and outside power was necessary. We propose herein a completely self contained plant, needing no outside power.

In the form of apparatus chosen to illustrate our invention, there are twin tanks 6 and 7, as shown in Fig. 1, in which water is treated to the chemical and settled and drawn off through floating outlet pipes 8 to the filter 9, from whence it ordinarily flows through the pipe 10 to the service, as for a heater or a boiler, or a storage tank such as used along the tracks of railways. Somewhere in the course of the outlet, as in the pipe 10, we place a water motor 11, which operates under the head of water in either tank, or the filter 9. Its shaft 12 may be provided with a pulley 13 which by a belt 14 operates a shaft 15, arranged to be engaged by clutches 15$^a$ and alternately or simultaneously revolve the pinions 16, 17, which in turn engage gears 18 on the shafts 19, 19$^a$, for operating the stirring paddles 23. These stirring paddles may be of the inclined form, and fixed on the shaft 19$^a$ as shown in the right hand tank 6. But in cases where violent stirring is necessary, as in using barium carbonate, we prefer to use the form of stirring device illustrated in detail in Fig. 3. The shaft 19 has radiating from it fixed arbors 20, on which are loosely mounted pinions 21, having extensions 22, upon which the paddles 23 are carried. As the shaft 19 and arbors 20 revolve, the pinions and paddles are rotated by engagement with a fixed rack 24 on the bottom of the tank.

By the above described means, whenever there is water being used from either one of the tanks 6 and 7, which flows out through the filter, or when the filter 9 itself contains water and is properly elevated, there is available power to operate the stirring devices, and this is so even though no water is being taken into the system. While water is being taken in, however, we may use this power, thus: The supply of water from pipe 25 in Fig. 1, is admitted to the treatment tanks not directly but through valve 25$^a$, motor 11, the pipe 26, and pipes 29 and 27, thus operating the water motor by pressure of the incoming water. In this way the stirring device may always be operated by the use of either the water being fed into or taken out of the system.

Often it is sufficient to run the paddles in one tank while water is being taken from the other; and in this case we operate by admitting the water through pipes 25 and 28 directly to pipe 29 and preferably admit it into the tanks at the bottom directly under the stirring devices as shown in tank 6. The manipulation of the valves necessary in any case, will be plain from the drawing.

In addition to the above described apparatus, and in order to provide a completely self contained system, requiring no power except the water pressure for any purpose, we may add the apparatus shown at the right of Fig. 1, which is essentially the same as that described in Greth's application No. 388,139 filed August 12th, 1907, without the lime saturater therein. Briefly, it comprises a valved branch pipe 31 from the supply pipe 26 or 23, leading through a displacement vessel 32, where the water mixes and carries up with it a chemical reagent previously fed in from the chemical mixer 33, as will be understood. When this is used for the lime, the valve 31 being open and 34, 36 and 38 shut, the solution is fed through pipe 35 to pipes 29 and 27 to the tanks. By regulating the valves 31 and 36 any desired proportion of feed water is diverted through the feeder 32. This apparatus has also extra branches 37 which, when valves 27$^a$ are closed and valves 38 are open, allows the reagent such as soda to be fed from the vessel 32 into the top of the treatment tanks in alternation or together, when desired. Either chemical may be fed in along with the main volume of water, or in the case of some treatments, the entire charge of chemical in vessel 32 may be displaced and carried up at once without introducing any appreciable amount of raw water with it. Where it is necessary to use a pump in drawing off the water for service, we arrange this part of the apparatus as in Fig. 4, where 40 is a pump in the pipe 10 leading from filter 9 and discharging through outlet pipe 41 after passing through the water motor 11. However, when desired the water motor can in all cases be cut out by means of a by-pass 42 or 42$^a$, leading directly to the service pipe 41.

By the above described apparatus it will be evident that the stirring devices may be operated at any time by means of the water which is used in the system, the power due to the potential energy of stored up water under head, being utilized, when no water is being fed in, while feeding of the chemical is operated by the incoming water, so as to do away with the necessity for any motor actuated by power independent of the purifying plant at any time.

It will of course be understood that our invention is not dependent upon the intermittent system, nor any particular form of the apparatus, as all that is necessary is to somewhere introduce a water motor into the line to the service pipe so as to employ the head in the treating tank, and thereby operate the stirring devices. For example our invention may well be applied to the continuous water purifying system to use the power of outflowing water.

Having thus described our invention and illustrated its use, what we claim as new and desire to secure by Letters Patent, is the following:

1. The combination in a water purifying system, of a plurality of treatment tanks, a stirring device in each tank, a water motor connected in the outlet line from all said tanks, a water inlet pipe having also a connection to said motor, and connections from the motor to the stirring devices whereby the latter may be continuously operated, the motor being driven either by incoming or outflowing water.

2. In water purifying apparatus, the combination with a pair of treatment tanks, having stirring devices therein, of a common driving shaft for said stirring devices, inlet and outlet connections to said tanks, having a common portion, a water motor in said common portion and adapted to be operated by incoming or outgoing water, the speed of said motor being controlled by the head of water in the treatment tanks, substantially as described.

3. In a water purifying system, the combination with treatment tanks and stirring devices therein, of means operated by the outflowing water to run the stirring devices, a chemical supply, and means actuated by the incoming water to feed the chemical supply into the system, substantially as described.

4. The combination in a water purifying system, of stirring devices, a chemical feeder, means operated by the incoming water to operate the feeder and means operated by either the incoming or outflowing water to operate the stirring devices.

5. The combination with a plurality of water treatment tanks and means to fill and empty them in alternation, of stirring devices therein and means employing the potential of the stored up water to continue the operation of the stirring devices after the introduction of water has ceased.

6. The combination with a plurality of water treatment tanks and means to fill and empty them in alternation, of stirring devices in the tanks and a motor operated by the water flowing either to or from the tanks and actuating said stirring devices, said motor being adapted to operate by the potential of the stored up water in the tanks to continue the operation of stirring devices after the introduction of water has ceased.

7. In water purifying apparatus, the combination with a treatment tank adapted for holding an unobstructed body of water, of a water inlet discharging upwardly directly in the bottom, a motor in the line of the water inlet and operated thereby, and a stirring device in said tank actuated by said motor and comprising paddles located at the bottom of the tank under said body of water and means rotating them horizontally on a vertical axis and simultaneously revolving them on a horizontal pivot, whereby to agitate the said body of water both with a rolling motion, and with upward currents, substantially as described.

8. In water purifying apparatus, the combination with two alternately acting treatment tanks, of a water inlet and a water outlet both common to said tanks, a water motor in the common portion of the inlet and outlet adapted to be operated by either incoming or outgoing water, and stirring devices in the tanks operated by said motor.

In testimony whereof, we have hereunder signed our names in the presence of the two subscribed witnesses.

EDWIN S. WOODS.
JOHN C. W. GRETH.

Witnesses:
F. W. H. CLAY,
CHAS. S. LEPLEY.